INVENTOR.
Floyd E. Jessmore
BY
Learman, Learman & McCulloch

3,616,828
FASTENER CONSTRUCTION
Floyd E. Jessmore, 1741 Sullivan Drive,
Saginaw, Mich. 48603
Filed Sept. 15, 1969, Ser. No. 857,695
Int. Cl. F16b *37/00, 39/02*
U.S. Cl. 151—19 A                                      12 Claims

ABSTRACT OF THE DISCLOSURE

A fastener according to the invention comprises a threaded bolt loosely accommodated in an annular, nut-like retainer and a tubular, interiorly threaded, split sleeve interposed between the bolt and the retainer. The sleeve and the retainer have a key and keyway, respectively, to prevent relative rotation therebetween. The retainer has a recess and the sleeve has a flange which overlies the base of the recess. A clamping cam acts between the base of the recess and the flange to contract the sleeve radially into snug engagement with the threads of the bolt and to exert an axial force on the sleeve to prevent looseness between the latter and the retainer.

---

The invention disclosed herein relates to fasteners and more particularly to a locking fastener adapted for use in conjunction with a threaded bolt, but which does not require relative rotation between the bolt and the fastener to effect assembly thereof.

There are many different kinds of locking fasteners for use in conjunction with threaded bolts and the like, but most of them require relative rotation between the bolt and an anchor device, such as a nut, to effect assembly of the parts. Some of the locking fasteners usable with threaded bolts do not necessarily require rotation of a nut, but in such cases it is not uncommon for the fastener to rely upon locking means such as set screws and the like to effect final locking of an anchor member to a bolt. Set screws and the like are objectionable for several reasons. For example, a set screw frequently causes irreparable damage to the threads of a bolt. Furthermore, the set screw frequently cannot be placed in a location in which it is easily accessible.

An object of this invention is to provide a locking fastener for use with a threaded bolt and which includes thread engaging means which need not be rotated relatively to the bolt to effect assembly with the latter.

Another object of the invention is to provide a locking fastener construction of the kind described and which may be rotated relatively to the bolt, if desired.

A further object of the invention is to provide a locking fastener construction adapted for use with a threaded bolt or the like and which does not injure the bolt threads.

Other objects and advantages of the invention will be pointed out specifically or will become apparent from the following description when it is considered in conjunction with the appended claims and the accompanying drawings, in which:

Figures 1, 2, 3, 4:
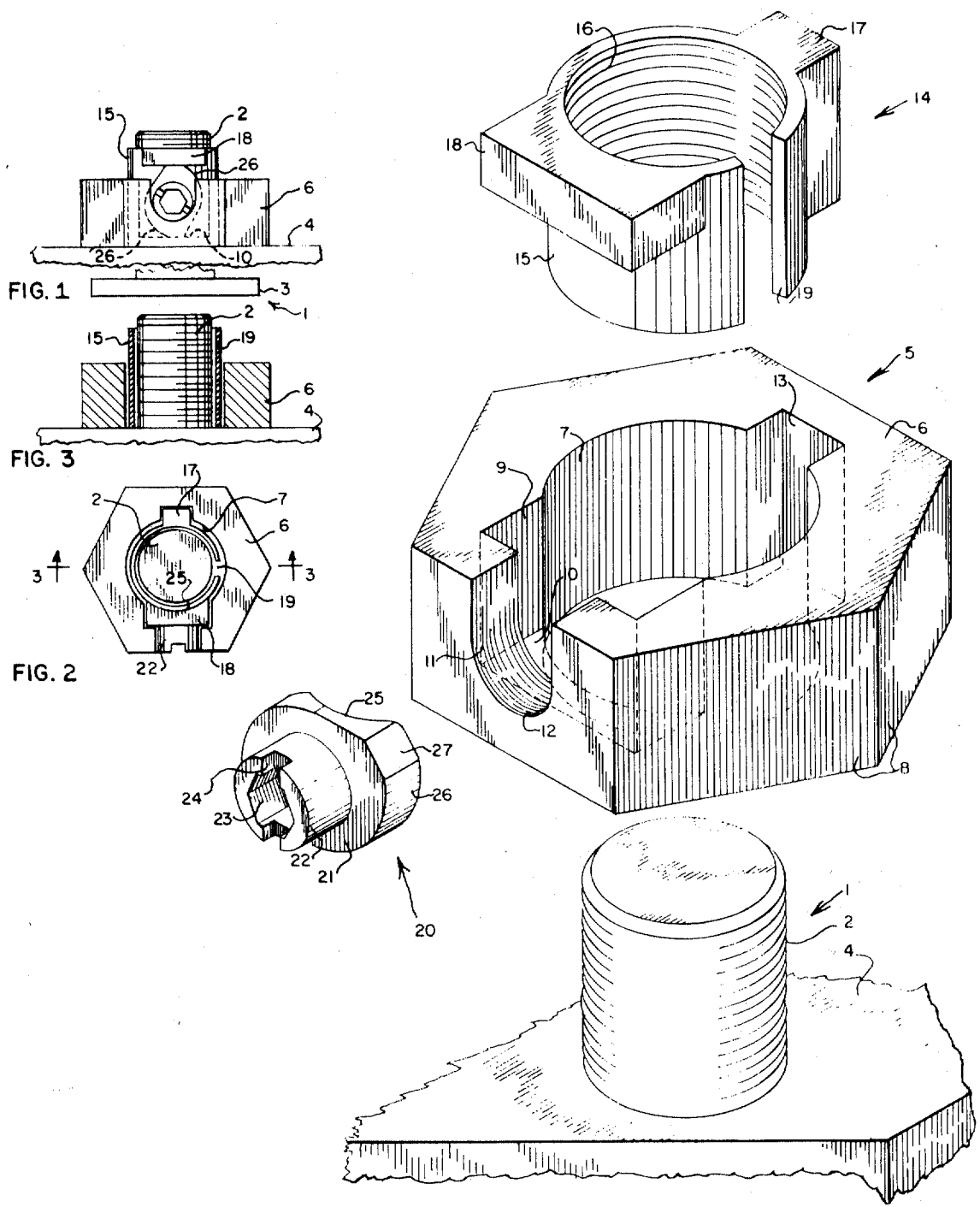
FIG. 1 is a fragmentary, side elevational view of a fastening device constructed in accordance with the invention and in locked condition.
FIG. 2 is a top plan view.
FIG. 3 is a sectional view taken on the line 3—3 of FIG. 2.
FIG. 4 is an enlarged, exploded, perspective view of the parts of the apparatus.

A fastening device constructed according to the invention comprises an anchor bolt 1 having a threaded shank 2 terminating at one end in an enlarged head 3, the threaded shank being adapted to pass through an opening in one or more members 4. A generally annular retaining member 5 comprises a body 6 having a bore 7 of such size as loosely to accommodate the bolt shank 2 therein. Preferably, the periphery of the member 5 is provided with flattened surfaces 8 as is common in the construction of nuts, but the bore 7 is smooth and unthreaded. Communicating with the bore 7 is a radially extending recess 9 having a base 10. In communication with the recess 9 is an axially extending slot 11 having a semi-circular bottom 12. Diametrically opposed to the recess 9 is a radially extending keyway 13 which extends from one side to the other of the body 6. If desired, the keyway 13 may be replaced by a recess and slot similar to the recess 9 and the slot 11.

Coupling means 14 is adapted to be interposed between the retaining member 5 and the anchor bolt 1 and comprises a sleeve 15 internally threaded as at 16 to correspond to the threading on the bolt shank 2. Projecting radially from the sleeve 15 is a key 17 adapted to fit in the keyway 13, and projecting in the radially opposite direction from the sleeve 15 is a flange 18 that is adapted to be accommodated in the recess 9 so as to overlie the base 10 of the recess. The sleeve 15 is axially split as at 19 midway between the keyway 17 and the flange 18. If the keyway 13 is replaced by a recess similar to the recess 9, the key 17 will be replaced by a flange similar to the flange 18.

The apparatus includes a clamp 20 comprising a body 21 that is adapted to fit in the recess 9 between its base 10 and the flange 18. A driving boss 22 extends from one side of the body 21 and may be provided with a wrench-accommodating socket 23 and a screw driver-accommodating slot 24 so as to enable the body 21 to be rotated. The opposite side of the body 21 is provided with an arcuate cam surface 25, the curvature of the cam surface corresponding substantially in the curvature of the sleeve 15. The periphery of the body 21 is formed with a pair of diametrically opposed cam surfaces 26, the cam surfaces 26 being separated from one another by a pair of flat dwells 27.

To condition the apparatus for operation, the clamp member 20 is fitted into the recess 9 with the projection 22 accommodated in the slot 11. The clamp member 20 is oriented in the recess in such manner that the curvature of the cam surface 25 is concentric with the bore 7 and with the low portions of the cam surfaces 26 confronting the flange 18 and the recess base 10, respectively. The assembled parts 5, 14 and 27 then may be slid onto the bolt shank 2. The inside diameter of the sleeve 15 is greater than the diameter of the bolt shank 2, thereby making it unnecessary to rotate the members 5 and 14 relatively to the bolt 1.

When the parts 1, 5, 14 and 20 are assembled, the locking cam 20 may be rotated clockwise from the position shown in FIG. 4 to the position shown FIG. 1. As the clamp is rotated, the cam surface 25 will act on the coupling member 14 so as to effect radial contraction of the sleeve 15 and effect engagement between the threads 2 and 16. As the clamp 20 continues to be rotated, the rising cam surfaces 26 will react between the recess base 10 and the flange 18 and exert an axial force on the coupling member 14 and effect wedging engagement between the interengaged threads 2 and 16. Upon rotation of the clamp 20 through substantially 90°, the dwells 27 will engage the recess base 10 and the flange 18, thereby precluding inadvertent rotation of the clamp. The cam surfaces 25 and 26 are so formed that the sleeve 15 is contracted prior to the application of axial force on the sleeve.

To disassemble the parts, the clamp 20 may be rotated counterclockwise from the position shown in FIG. 1 whereupon the axial force on the sleeve first is relieved, following which the contracting force on the sleeve is relieved. The bolt 1 then may be slid out of the sleeve.

Should it be desirable or necessary to rotate the fastener assembly when it is secured to the bolt, rotation may be accomplished by fitting a wrench to the member 5 and turning the latter. The sleeve 15 will be forced to turn due to the fitting of the key into the keyway and will act exactly like a conventional nut.

The disclosed embodiment is representative of a presently preferred form of the invention but is intended to be illustrative rather definitive thereof. The invention is defined in the claims.

I claim:

1. A fastener construction comprising anchor means; annular retainer means accommodating said anchor means and having a radially extending recess therein. split sleeve coupling means interposed between said anchor means and said retainer means; a radially extending flange on said coupling means overlying said recess; and clamp means accommodated in said recess reacting between said retainer means and said coupling means for clamping the latter snugly about said anchor means, said clamp means having first cam means in engagement with said coupling means and second cam means in engagement with said flange and said retainer means.

2. The construction set forth in claim 1 wherein said anchor means is exteriorly threaded and said coupling means is correspondingly interiorly threaded.

3. The construction set forth in claim 1 wherein said sleeve has a radially extending key and wherein said retaining means has a keyway in which said key is accommodated.

4. The construction set forth in claim 1 wherein said second cam means has dwells for engagement respectively with said flange and said retaining means.

5. A fastener construction adapted for use with an anchor member having external threads, said construction comprising a retainer having an opening therein of such size as loosely to accommodate said anchor member, said retainer having therein a recess provided with a base; a coupling sleeve member having an axial bore of such size as loosely to accommodate said anchor member and having an external diameter of such size as to be interposed between the latter and said retainer, said sleeve member having internal threads and a flange overlying the base of said recess; and clamp means carried by said retainer between said flange and the base of said recess and operable to contract said sleeve member radially to engage the threads on said members and to exert an axial force on said sleeve member while said threads are engaged, said clamp means having a first cam surface in engagement with the base of said recess and a second cam surface in engagement with said flange.

6. The construction set forth in claim 5 wherein said sleeve is axially split.

7. The construction set forth in claim 5 wherein said sleeve has a radial key accommodated in a keyway formed in said retainer member.

8. The construction set forth in claim 5 including means for rotating said clamp means.

9. The construction set forth in claim 5 wherein said cam surfaces are spaced by dwells.

10. A fastener construction comprising externally threaded anchor means; an annular retainer having a smooth bore of such size as loosely to accommodate said anchor means; split sleeve coupling means having a curved exterior and having a threaded bore of such size as loosely to accommodate said anchor means and being of such size as to be accommodated between said anchor means and said retainer; a clamp member interposed between said retainer and said coupling means and having an arcuate surface confronting and corresponding substantially to the curvature of the exterior of said coupling means; and means for rotating said clamp means relatively to said retainer and said coupling means whereby said arcuate surface of said clamp means effects radial contraction of said coupling means into clamping engagement with said anchor means and wedging of said clamp means between said coupling means and said retainer.

11. The construction set forth in claim 10 wherein the bore of said retainer has a recess therein in which said clamp means is accommodated.

12. The construction set forth in claim 11 wherein said recess has a base and said coupling means has a flange overlying said base, said clamp means reacting between said base and said flange in response to rotation of said clamp means to urge said retainer and said coupling means to move axially relatively to one another.

References Cited

UNITED STATES PATENTS

| | | | |
|---|---|---|---|
| 530,963 | 12/1894 | Rhodes | 151—19 |
| 1,594,221 | 7/1926 | Strongson | 85—33 UX |
| 2,291,687 | 8/1942 | Brobst | 151—21 C UX |
| 2,321,466 | 6/1943 | Crowther | 151—19 |
| 2,932,898 | 4/1960 | Enders | 151—19 X |

RAMON S. BRITTS, Primary Examiner

U.S. Cl. X.R.

85—33